United States Patent
Schmitt et al.

(10) Patent No.: US 9,835,076 B2
(45) Date of Patent: Dec. 5, 2017

(54) DECOUPLING ELEMENT FOR AN EXHAUST SYSTEM

(71) Applicant: Eberspaecher Exhaust Technology GmbH & Co. KG, Neunkirchen (DE)

(72) Inventors: Markus Schmitt, Merchweiler (DE); Michael Schmidt, Friedrichsthal (DE)

(73) Assignee: Eberspaecher Exhaust Technology GmbH & Co. KG, Neunkirchen (DE)

( * ) Notice: Subject to any disclaimer, the term of this patent is extended or adjusted under 35 U.S.C. 154(b) by 630 days.

(21) Appl. No.: 13/678,460

(22) Filed: Nov. 15, 2012

(65) Prior Publication Data

US 2013/0313819 A1   Nov. 28, 2013

(30) Foreign Application Priority Data

Nov. 16, 2011   (DE) .................. 10 2011 086 463

(51) Int. Cl.
*F01N 13/18* (2010.01)
*F16L 55/033* (2006.01)
*F16L 27/11* (2006.01)

(52) U.S. Cl.
CPC ..... *F01N 13/1827* (2013.01); *F01N 13/1816* (2013.01); *F16L 27/11* (2013.01);
(Continued)

(58) Field of Classification Search
USPC ...... 285/49, 226, 288.1–288.5, 903; 138/121
See application file for complete search history.

(56) References Cited

U.S. PATENT DOCUMENTS 2,232,657 A * 2/1941 Davis ............................ 285/226
3,169,785 A * 2/1965 Ziebold ........................ 285/226
(Continued)

FOREIGN PATENT DOCUMENTS

DE   2658481 A1   7/1977
DE   4025652      5/1991
(Continued)

OTHER PUBLICATIONS

Chinese Office Action for Patent Application No. 201210465764.9, dated Aug. 5, 2014 (14 pages).
(Continued)

*Primary Examiner* — Aaron Dunwoody
*Assistant Examiner* — Fannie Kee
(74) *Attorney, Agent, or Firm* — Neal, Gerber & Eisenberg LLP

(57) ABSTRACT

A decoupling element for an exhaust system (1) of a combustion engine, with an elastic exhaust gas-conducting body (3), with at least one support ring (7) connected to the body (3) in a fixed manner, which encloses an axial end portion (8) of the body (3) on the outside in the circumferential direction (5), and with at least one flange (9), which is fastened to the support ring (7) by means of a weld seam (12), wherein the flange (9) comprises a connecting piece (13), which is inserted in the end portion (8) of the body (3) enclosed by the support ring (7), and wherein the weld seam (12) is configured circumferential on the outside and connects an axial face end (14) of the support ring (7) facing away from the body (3) to the outer circumference (15) of the connecting piece (13) of the flange (9).

13 Claims, 2 Drawing Sheets

(52) U.S. Cl.
CPC ...... *F16L 55/0332* (2013.01); *F01N 13/1855* (2013.01); *F01N 2450/22* (2013.01)

(56) References Cited

U.S. PATENT DOCUMENTS

| | | | | |
|---|---|---|---|---|
| 4,106,798 | A | * 8/1978 | Haug | ............................ 285/226 |
| 5,318,329 | A | * 6/1994 | Suzuki | ............................ 285/49 |
| 5,480,194 | A | 1/1996 | Mantoan et al. | |
| 5,542,715 | A | 8/1996 | Mantoan et al. | |
| 6,354,332 | B1 | * 3/2002 | Burkhardt | ..................... 138/109 |
| 2003/0102666 | A1 | 6/2003 | Huber | |
| 2005/0268602 | A1 | 12/2005 | Smatloch et al. | |
| 2011/0073209 | A1 | 3/2011 | Eguchi et al. | |

FOREIGN PATENT DOCUMENTS

| | | |
|---|---|---|
| DE | 10158877 A1 | 6/2003 |
| DE | 20 2006 018 593 U1 | 5/2008 |
| EP | 1235020 A1 | 8/2002 |
| EP | 848143 A1 | 5/2003 |
| EP | 2450545 A1 | 9/2012 |
| EP | 2594761 A2 | 5/2013 |

OTHER PUBLICATIONS

German Office Action with Search Results Patent Application DE 102011086463, dated Jul. 12, 2012, 7 pages.
German Office Action for Patent Application DE 10 2011 086 463, dated Aug. 30, 2013, 7 pages.
Writ of Opposition to German Patent No. DE 10 2011 086 463, filed Oct. 7, 2015 (12 pages).
European Search Report for European Patent Application No. 12191677.9, dated Mar. 30, 2017. (6 pages).
Notice of the Second Office Action for Chinese Patent Application No. 201210465764.9, dated Apr. 3, 2015. (3 pages).

* cited by examiner

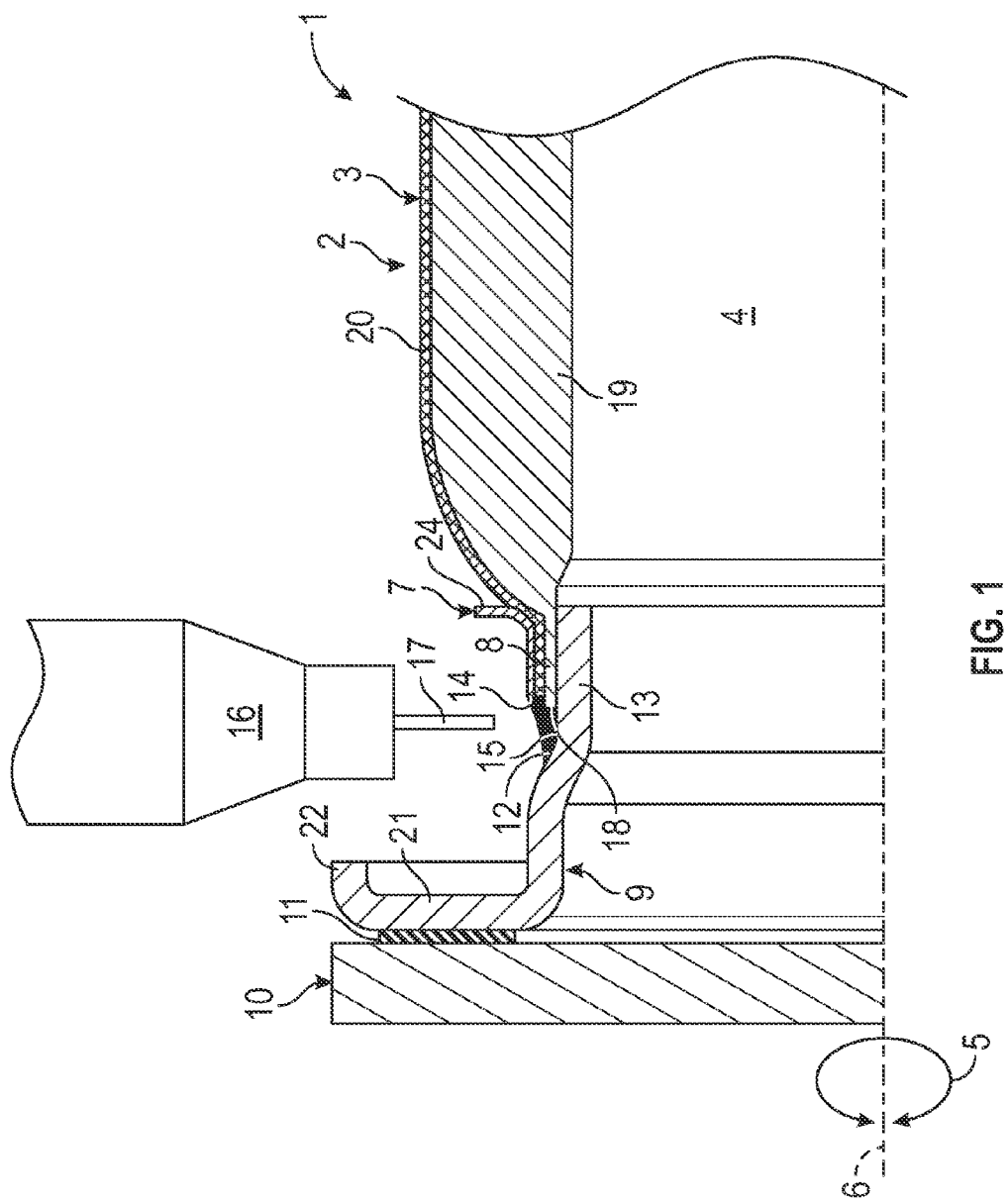

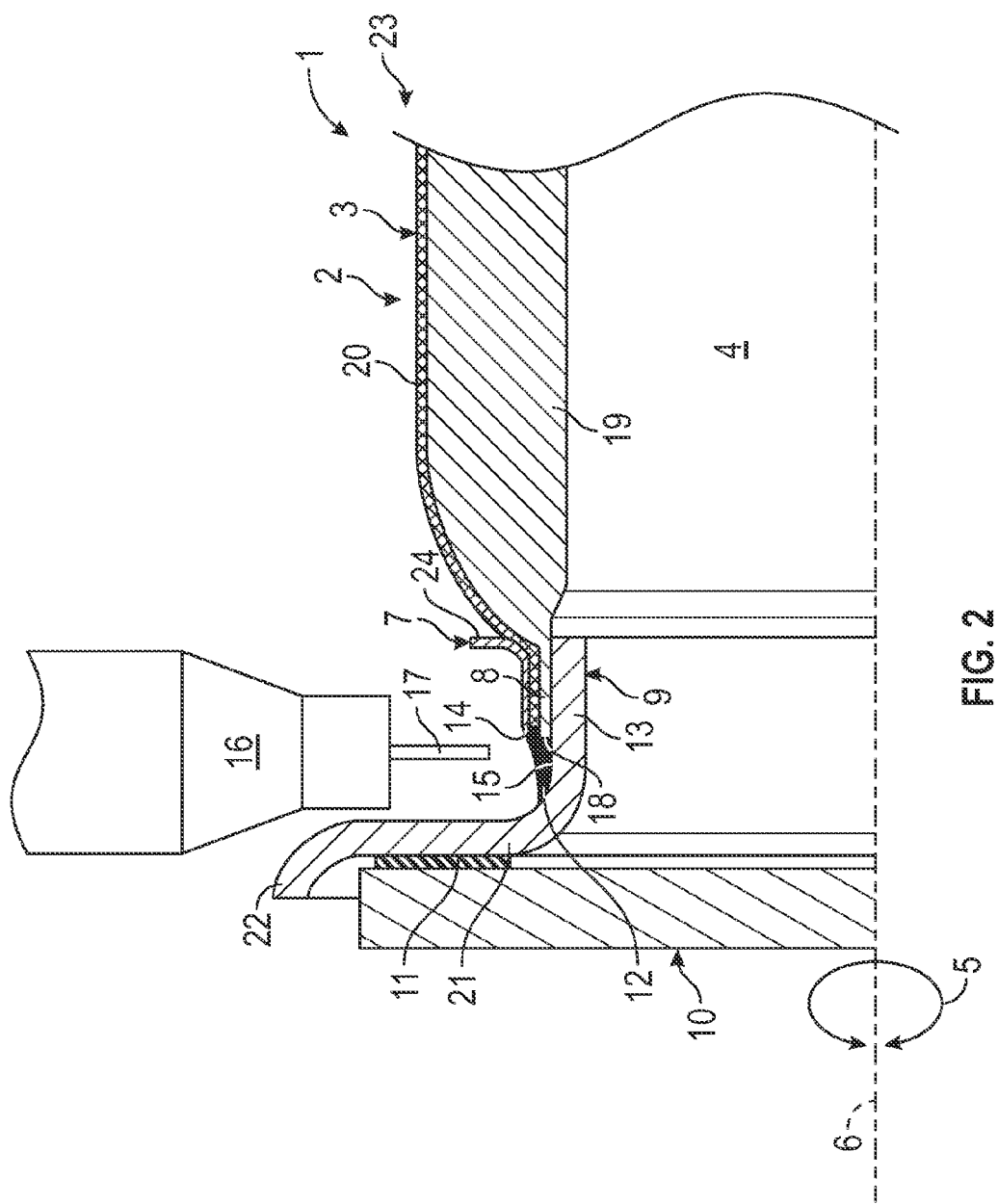

DECOUPLING ELEMENT FOR AN EXHAUST SYSTEM

CROSS-REFERENCE TO RELATED APPLICATION

This non-provisional patent application claims priority to German Patent Application No. DE 102011086463.6, filed on Nov. 16, 2011.

TECHNICAL FIELD

The present invention relates to a decoupling element for an exhaust system of a combustion engine, in particular of a motor vehicle. The present invention additionally relates to an exhaust system for a combustion engine, in particular of a motor vehicle, which is equipped with at least one such decoupling element.

BACKGROUND OF THE INVENTION

In exhaust systems, decoupling elements are mainly employed for decoupling load change movements and vibrations between engine and exhaust system. For example, such a decoupling element can be arranged as exhaust gas-conducting portion of an exhaust line between a catalytic converter close to the engine and a middle silencer of the exhaust system in the exhaust line. To this end, such a function element comprises an elastic exhaust gas-conducting body which on its longitudinal ends can be incorporated in the exhaust line in a suitable manner. Here, on its longitudinal ends, said body can each be connected to a pipe section or be already connected in a fixed manner to an exhaust gas treatment device of the exhaust system at least on one longitudinal end. The body of the decoupling element has a construction that is suitable for the temperatures and pressures of the exhaust system that occur and consists of suitable materials. On the respective axial end of the body, a support ring can be provided which encloses an axial end portion of the body from the outside in the circumferential direction. For certain installation situations, the decoupling element can be additionally equipped with one flange, which is fastened to the support ring by means of a weld seam. With the help of the flange, the decoupling element can for example be connected to an exhaust gas treatment device. It is likewise possible with the help of such a flange to fasten the decoupling element to a periphery of the exhaust system, e.g. to an undercarriage of a vehicle.

In the case that the support ring is inserted into a receiving opening of the flange, and in the case that the respective axial end portion of the body axially protrudes over the support ring due to the manufacture, there is the risk when producing the welded connection between flange and support ring that the weld seam primarily joins up with the axial face end of the end portion and only secondarily or not at all with the support ring, so that the welded connection ultimately only exists between the face end of the body and the flange. For with such a constellation a welded point located inside is created, which additionally can be largely covered by an annular shoulder formed in the flange and serving as axial stop for the support ring, which renders the accessibility of the weld seam more difficult. In order to avoid this, a more elaborate preparation of the decoupling element in the region of the support ring is required, for example in order to remove the end of the associated end portion axially protruding on the support ring.

SUMMARY OF THE INVENTION

The present invention deals with the problem of stating an improved or at least another embodiment for such a decoupling element or for an exhaust system equipped with such a decoupling element, which is characterized in particular by a welded connection between flange and support ring with adequate reliability that can be realized in a cost-effective manner.

According to the invention, this problem is solved through the subjects of the independent claims. Advantageous embodiments are subject of the dependent claims.

The invention is based on the general idea of equipping the flange with a connecting piece, so that the connecting piece can be axially inserted into the end portion of the body enclosed by the support ring. Following this, the weld seam can be put up on the outer circumference. In particular through the better visibility of the welding joint, the weld seam can now be realized comparatively easily so that it connects an axial face end of the support ring to an outer circumference of the connecting piece of the flange.

Through the proposed arrangement, the desired welded connection between support ring and flange can be produced comparatively easily with high reliability. In particular, a cost-intensive preparation of the welding joint can thus be omitted.

According to a particularly advantageous embodiment, the end portion of the body that is radially arranged between the outer circumference of the connecting piece and the support ring can axially extend as far as to the face end of the support ring, wherein the circumferential weld seam then connects the face end of the support ring to the outer circumference of the connecting piece subject to the inclusion of an axial face end of the end portion. In particular, the face end of the end portion can be incorporated in the weld seam in this case. The latter requires that the respective material of which the body is produced is compatible with the production of such a welded connection. By doing so, a particularly close connection with high strength between flange, support ring and body is obtained.

Alternatively, support ring and end portion of the body can also be matched to one another such that the axial face end of the support ring facing away from the body, axially protrudes over the axial face end of the end portion. In this case, the weld seam bridges a radial gap between the outer circumference of the outer piece and the support ring. Since the support ring in turn is connected to the body in a fixed manner in a suitable manner for example via a soldered connection or another welded connection, an adequately strong connection of the flange to the body can also be realised by this.

According to an advantageous embodiment, the body can be configured at least in two layers, wherein an inner layer and an outer layer are provided. In this case, the outer layer encloses the inner layer. Practically, outer layer and inner layer extend as far as into the respective axial end portion and accordingly axially as far as into the support ring and if required also through the support ring.

Practically, the inner layer can be configured as flex hose or flexible conduit (referred to as agraffe in German). Such flex hose structure is generally known for example for the pressure-stable and flexible encasing of shower hoses, and consists of a spiraling radial extension of the exterior hose surface, which, in turn, forms a spiraling expansion chamber along the inside of the hose. Alternatively, the inner layer can also be configured as corrugated pipe which likewise has a high flexibility. The outer layer, by contrast, can be configured as wire mesh. Both the inner layer as well as the outer layer are practically produced from a metallic material, preferentially an iron alloy.

According to another advantageous embodiment, both layers of the body can extend as far as to the face end of the end portion and be bridged by the weld seam so that at least one of the two layers is incorporated in the weld seam or without connection to the weld seam, is enclosed by the latter.

According to another embodiment, the inner layer axially extends beyond the outer layer. In this case the weld seam has a better contact to the inner layer.

With another advantageous embodiment, the flange can comprise a preferentially circumferential collar standing away from the connecting piece to the outside, which is provided for fastening the flange to the periphery of the exhaust system or to an exhaust gas treatment device. In particular, a configuration of the decoupling element as load-bearing decoupling element can thus be realised with the help of the collar.

Insofar as the decoupling element, in particular via its flange, is fastened to a periphery of the exhaust system, the decoupling element additionally has a load-bearing function, so that it can also be described as load-bearing decoupling element. If such a flange by contrast only serves for fastening the decoupling element to an exhausts gas treatment device, the decoupling element as a rule does not assume any load-bearing function and, accordingly, can also be described as non-load-bearing decoupling element.

With a preferred further development, the flange can now comprise an axially angled-off preferentially circumferential rim on the collar distally from the connecting piece. With the help of such an angled-off rim, the stiffness of the flange, in particular in the region of the collar can be significantly increased, which simplifies a stable fixing of the flange to a mating flange complementary thereto.

With a further advantageous further development, the rim can be angled-off towards the body, as a result of which the decoupling element in the region of the flange can be configured comparatively compact in radial direction. Alternatively to this, the rim can be angled-off away from the body as a result of which the flange requires more space in the radial direction in order to be able to attach it to a mating flange, but with such an embodiment the axial space requirement of the decoupling element is reduced in the region of the flange. The flange is preferably a shaped sheet metal part. The connecting piece in this case can be configured as passage and be produced in particular through deep drawing.

According to another embodiment, the support ring comprises a circumferential collar radially standing away from the support ring to the outside. In particular, the collar of the support ring is arranged at an axial end of the support ring which is turned away from the weld seam. With the help of such an angled-off collar, the stiffness of the support ring can be significantly increased.

An exhaust system according to the invention is characterized in that in an exhaust line of the exhaust system at least one decoupling element of the type described above is incorporated. Here, the decoupling element can be configured as load-bearing decoupling element or as non-load-bearing decoupling element. The respective decoupling element can be connected to a pipe body of the exhaust line on the one longitudinal end within the exhaust line. On the other longitudinal end, the decoupling element can be connected to another pipe body of the exhaust line or to another exhaust gas treatment device of the exhaust line.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference characters relate to same or similar or functionally same components.

FIG. 1 is a highly simplified longitudinal section through an exhaust system in the region of a flange of a decoupling element.

FIG. 2 is a view as in FIG. 1, however with another embodiment.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

According to the FIGS. 1 and 2, an exhaust system 1 that is only partially represented here in an exhaust line 23 can comprise a decoupling element 2 which is likewise only partially represented here, for example in order to achieve a decoupling in terms of vibration and in terms of movement between a combustion engine and the exhaust system 1, which discharges the exhaust gases of the combustion engine. Practically, the exhaust system 1 is accommodated together with the combustion engine in a vehicle that is not shown here and in the process practically arranged on an undercarriage of the vehicle. The exhaust line 23 for example includes a catalytic converter which is not shown and a silencer which is not shown.

The decoupling element 2 comprises an elastic body 3, which is configured as hollow body for conducting exhaust gas or encloses a hollow space 4 in a circumferential direction 5. The circumferential direction 5 in this case relates to a longitudinal center axis 6 of the decoupling element 2. The decoupling element 2 additionally comprises at least one support ring 7, which is connected to the body 3 in a fixed manner. In addition, the support ring 7 encloses an axial end portion 8 of the body 3 in the circumferential direction 5 from the outside or on an outside. Accordingly, the support ring 7 is fitted onto the end portion 8 on the outside or the end portion 8 is inserted into the support ring 7. Support ring 7 and end portion 8 are suitably interconnected in a fixed manner for example by means of a welded connection which is not shown here or by means of a soldered connection which is not shown here.

The decoupling element 2 additionally comprises at least one flange 9, with which the decoupling element 2 for example can be fastened to a mating flange 10. The mating flange 10 can for example be formed on an exhaust gas treatment device of the exhaust system 1. Likewise, the mating flange 10 can be formed on a periphery of the exhaust system 1. Accordingly, the decoupling element 2 can be configured as load-bearing decoupling element 2 or as non-load-bearing decoupling element 2. In each case, the flange 9 is fixed to the mating flange 10 for example via an annular disc-shaped sealing element 11 or for example by means of screw connections which are not shown here.

The flange 9 is fastened to the support ring 7 by means of a weld seam 12. Practically, the weld seam 12 is configured circumferential in the circumferential direction 5. To make it possible that the weld seam 12 can be arranged on the outside or be put up from the outside, the flange 9 comprises a connecting piece 13 which is inserted in the end portion 8 of the body 3 enclosed by the support ring 7. The weld seam 12 can now be put up circumferentially on the outside so that it connects an axial face end 14 of the support ring 7 facing away from the body 3 to an outer circumference 15 of the connecting piece 13. Through this measure, the weld seam 12 can be produced comparatively easily, since the circumferential welding joint located outside and provided for the production of the weld seam 12 is relatively easily accessible for a welding tool 16, so that for example a welding wire 17 is not impeded through an undercut or the like. As a consequence, the weld seam 12 can be realised with a high reliability so that it securely and directly connects said face end 14 of the support ring 7 with the outer circumference 15 of the connecting piece 13.

In the case of the example shown here, the end portion 8 of the body 3 arranged radially between the outer circumference 15 of the connecting piece 13 and the support ring 7 axially extends as far as to the face end 14 of the support ring 7. The circumferential weld seam 12 can now connect the face end 14 of the support ring 7 with the outer circumference 15 of the connecting piece 13 subject to the inclusion of an axial face end 18 of the end portion 8. In particular, in this case, said face end 18 of the end portion 8 can be incorporated in the weld seam 12, so that ultimately the end portion 8 via the weld seam 12 is welded both to the connecting piece 13 as well as to the support ring 7.

Practically, the body 3 is configured in at least two layers. Accordingly, the body 3 comprises at least one inner layer 19 and one outer layer 20, which encloses the inner layer 19 in the circumferential direction 5. The outer layer 20 is practically configured as wire mesh. The inner layer 19 can be configured as flex hose or as corrugated pipe. Insofar as the body 3 is configured in two layers or multiple layers, the two layers 19, 20 or all layers 19, 20 of the body 3 can extend as far as to the face end 18 of the end portion 8 and accordingly, be bridged by the weld seam 12. Insofar, as shown here, the axial face end 18 of the end portion 8 axially protrudes over the face end 14 of the support ring 7, the individual layers 19, 20 of the body 3 can be incorporated in the weld seam 12. If, by contrast, the face end 14 axially protrudes over the face end 18 of the end portion 8, the layers 19, 20 on the face end 18 of the end portion 8 are enclosed by the weld seam 12 in the radial annular gap between connecting piece 13 and support ring 7.

In the case of the embodiments shown here, the flange 9 each comprises a collar radially standing away from the connecting piece 13 to the outside, i.e. practically running about in the circumferential direction 5. Because of the collar 21 that is angled off relative to the connecting piece 13, the flange 9 has a comparatively high dimensional stability. The collar 21 can for example be used for fastening the flange 9 to the mating flange 10. For stiffening the flange 9 in the region of the collar 21, an axially angled-off rim 22 preferentially running in the circumferential direction 5 can be formed on the collar 21 distally from the connecting piece 13. In the case of the embodiment shown in FIG. 1, the rim 22 is angled off the collar 21 towards the body 3. Because of this, the flange 9 is a comparatively compact construction in the radial direction. In the case of the embodiment shown in FIG. 2, the rim 22 is angled off the collar 21 away from the body 3, as a result of which the flange is a comparatively compact construction in the axial direction.

According to the embodiments of FIGS. 1 and 2 the support ring 7 comprises a circumferential collar 24 radially standing away from the support ring 7 to the outside. In particular, the collar 24 of the support ring 7 is arranged at an axial end of the support ring 7 which is turned away from the weld seam 12.

It should be emphasized that the above-described exemplary embodiment of the present invention, is merely an example configuration set forth for a clear understanding of the principles of the invention. Other variations and modifications may be made to the above-described embodiments of the invention without substantially departing from the spirit and principles of the invention. All such modifications are intended to be included herein within the scope of this disclosure and the present invention and protected by the following claims.

What is claimed is:

1. A decoupling element for an exhaust system of a combustion engine comprising:
   an elastic exhaust gas-conducting body having an axial end portion;
   a support ring connected to the body and surrounding the axial end portion of the body in a circumferential direction; and
   a shaped sheet metal flange fastened to the support ring by a weld seam, the flange comprising:
      a connecting portion inserted into the axial end portion of the body; and
      a circumferential collar portion axially distal from the weld seam and extending radially away from the connecting portion, the collar portion of the flange comprising an axially angled-off rim arranged at a radial outer end of the collar portion;
   wherein the weld seam extends circumferentially around the decoupling element, connecting an axial face end of the support ring facing away from the body to an outer circumference of the connecting portion of the flange; and
   wherein the support ring comprises a support ring collar extending radially away from the support ring, the support ring collar arranged at an axial end of the support ring turned away from the weld seam.

2. The decoupling element according to claim 1, wherein the axial end portion of the body axially extends at least as far as to the face end of the support ring.

3. The decoupling element according to claim 2, wherein the axial end portion of the body is incorporated in the weld seam.

4. The decoupling element according to claim 1, wherein the body comprises at least an inner layer and an outer layer enclosing the inner layer.

5. The decoupling element according to claim 4, wherein the inner layer is configured as flex hose or as corrugated pipe, and wherein the outer layer is configured as wire mesh.

6. The decoupling element according to claim 4, wherein the inner layer and the outer layer are both bridged by the weld seam.

7. The decoupling element according to claim 6, wherein the inner layer axially extends beyond the outer layer.

8. The decoupling element according to claim 1, wherein the axially angled-off rim is distal from the connecting portion.

9. The decoupling element according to claim 1, wherein the axially angled-off rim is angled-off in a direction facing toward the body.

10. The decoupling element according to claim 1, wherein the axially angled-off rim is angled-off in a direction facing away from the body.

11. The decoupling element according to claim 1, wherein the circumferential collar portion of the flange is adapted to be separated from a second flange by a sealing element.

12. The decoupling element according to claim 1, wherein the circumferential collar portion of the flange is adapted to be directly connected to a second flange.

13. The decoupling element according to claim 1, wherein the flange extends axially from the connecting portion to the circumferential collar portion a distance sufficient to allow access for a weld tool to generate the weld seam at an angle substantially perpendicular to the connecting portion.

* * * * *